(12) United States Patent
Wallace et al.

(10) Patent No.: US 6,239,785 B1
(45) Date of Patent: *May 29, 2001

(54) TACTILE COMPUTER INPUT DEVICE

(75) Inventors: Michael G. Wallace; Philip D. Askenazy, both of Albuquerque, NM (US)

(73) Assignee: Science & Technology Corporation, Albuquerque, NM (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/927,110

(22) Filed: Aug. 29, 1997

Related U.S. Application Data (63) Continuation-in-part of application No. 07/957,874, filed on Oct. 8, 1992, now Pat. No. 5,666,473.

(51) Int. Cl.[7] .................................................. G09G 5/00
(52) U.S. Cl. ............................................................. 345/156
(58) Field of Search ..................................... 345/437, 438, 345/126, 156, 158, 179, 173; 341/27, 34; 901/33, 46

(56) References Cited

U.S. PATENT DOCUMENTS

| 3,919,691 | * | 11/1975 | Noll ................................. 340/172.5 |
| 4,885,702 |   | 12/1989 | Ohba . |
| 4,935,728 | * | 6/1990 | Kely ..................................... 345/161 |
| 5,010,773 | * | 4/1991 | Lorentz et al. .................. 73/862.04 |
| 5,055,838 |   | 10/1991 | Wise et al. . |
| 5,136,687 | * | 8/1992 | Edelman et al. ....................... 395/22 |
| 5,148,372 |   | 9/1992 | Maiocco et al. . |
| 5,237,647 |   | 8/1993 | Roberts et al. . |
| 5,261,266 | * | 11/1993 | Lorenz et al. ........................ 73/1 B |
| 5,565,891 | * | 10/1996 | Armstrong ........................... 345/167 |
| 5,666,473 |   | 9/1997 | Wallace . |
| 5,691,747 | * | 11/1997 | Amano ................................. 345/167 |

FOREIGN PATENT DOCUMENTS

WO92/02007 * 6/1992 (WO) .............................. G09G/3/02

OTHER PUBLICATIONS

Coquillart, Sabine, Extended Free–Form Deformation: A Sculpturing Tool for 3D Geometric Modeling, *Computer Graphics*, vol. 24, pp. 187–195, Aug. 1990.

Foley, James D. et al., *Computer Graphics Principles and Practice, Second Edition*, Addison–Wesley System Programming Series Consulting Editors, pp. 213–217.

Galyean, Tinsley A. et al.,Sculpting: An interactive Volumetric Modeling Technique, *Computer Graphics*, vol. 25, pp. 267–274, Jul. 1991.

Pentland A., et al., *The Thing World Modeling System: Virtual Sculpting by Modal Forces*, Vison and Modeling Group, pp. 143–144.

Sederberg, Thomas W., et al., *Free–Form Deformation of Solid Geometric Models, Siggraph 86*, vol. 20, pp. 151–160, Aug. 18–22, 1986.

Williams, Lance, *3D Paint*, NYIT Computer Graphics Lab, pp. 225–233.

* cited by examiner

*Primary Examiner*—Amare Mengistu
(74) *Attorney, Agent, or Firm*—Jeffrey D. Myers (57) ABSTRACT

A computer interface apparatus and method employing an essentially closed convex exterior surface comprising a plurality of tactile sensors and communication apparatus which exports signals from the tactile sensors to a computer.

22 Claims, 8 Drawing Sheets

FIG-1

A THREE-DIMENTIONAL INTERFACE DEVICE

TACTILE COMPUTER INPUT DEVICE

CROSS-REFERENCE TO RELATED APPLICATIONS

This application is a continuation-in-part application of U.S. patent application Ser. No. 07/957,874, entitled "Tactile Computer Aided Sculpting Device", to Michael G. Wallace, filed on Oct. 8, 1992, issued on Sep. 9, 1997, as U.S. Pat. No. 5,666,473, and the specification thereof is incorporated herein by reference.

BACKGROUND OF THE INVENTION

1. Field of the Invention (Technical Field)

The present invention relates to computer input devices. More particularly, the present invention relates to an intuitive means for controlling the negotiation of a three-dimensional space (either virtual or real) including control of the orientation of the traveler and the direction of travel.

2. Background Art

In a computer environment, objects such as cursors, icons, and gaming objects are moved according to the desire of the user. These items will be referred to in this document as "surrogates". Numerous methods have been developed to facilitate the movement of surrogates in a manner responsive to the user's will. Several examples in the field of two-dimensional (2D) computer displays are illustrative:

For the first example, the movement of a cursor up or down or right or left within a vertically oriented computer display screen can often be accomplished simply by pressing one of four different keys on the computer keyboard, each with an arrow depicting the desired direction of travel. Usually the most effective arrangement of this sort is the one in which the keys are located relative to each other in the same way that their movement control is oriented. For example, a mere row of four adjacent keys, even with arrows on them depicting direction of movement control, is not as intuitive or easy to use as those same keys arranged as a cross. In such a cross configuration, the top and bottom keys represent North (N) and South (S) (or up and down) respectively. The left and right keys then represent left and right (or West (W) and East (E)) respectively. Not surprisingly, the better computer keyboards offer such a cross arrangement. This type of capability could be termed a projection approach. The surrogate is projected in various directions by command keys configured in a manner analogous to the direction of projection.

For the second example, the movement of a cursor in any direction within a vertically oriented computer display screen can be accomplished by the use of a computer mouse. In this case, the user physically moves the mouse in any direction along the plane of the platform that the mouse rests upon. The cursor moves in a corresponding manner along the plane (for all practical purposes) of the computer display device. This type of capability could be termed a displacement approach. The surrogate is transposed to different locations by analogous displacements applied to the mouse.

Although keyboard keys generally have up and down motions, the concept of the first example would hold even if the keys were flat and did not move, so long as they registered the touch of the user appropriately. Yet, for the second example, physical displacement of the mouse is a necessary characteristic of its functionality.

A common computer joystick is another example of a displacement approach, even though its base is usually stationary. This is because the stick must be moved physically in a direction analogous to the desired direction of travel.

Modifications of many of these devices have been developed for applications within three-dimensional (3D) computer display environments. Within the projection class, the most common approaches are on-screen 2D icons, essentially keys, that when pressed (usually, selected and activated by moving a mouse cursor and then pressing a mouse button in the customary fashion), effect a projection of the surrogate in various directions. Within the displacement class, devices such as the Polhemus Isotracker (TM) have been developed. Such devices are physically moved by the user in various directions, effecting corresponding movements by the surrogate. Other displacement devices are similar (or identical) to computer joysticks, in that their bases are stationary, yet the extended arm is moved physically to effect corresponding motions of the surrogate.

The present invention presents a novel class of device permitting a different approach to navigation in spaces.

SUMMARY OF THE INVENTION (DISCLOSURE OF THE INVENTION)

The present invention is of a computer interface device and method comprising use of tactile input means comprising an essentially closed convex exterior surface comprising a plurality of tactile sensors and communicating signals from the tactile sensors to a computer equipped with a display. In the preferred embodiment, an object on the display is represented by a three-dimensional data structure. The data structure is manipulated in response to pressure stimuli on the tactile sensors, such as translating to a different apparent position within a space represented by the data structure in response to pressure stimuli on the tactile sensors, and rotating an object represented by the data structure in response to pressure stimuli on a plurality of the tactile sensors. The tactile input means may be equipped to rotate and incorporate detection of rotation and concomitant rotation of the data structure in response to a detected rotation of the tactile input means.

The invention is also of a computer interface device and method comprising use of tactile input means comprising an essentially closed convex exterior surface comprising a plurality of tactile sensors and communicating signals from the tactile sensors to a computer. In the preferred embodiment, tactile input on the sensors is communicated. The tactile input means may be equipped to rotate and incorporate detection of rotation and concomitant rotation of the data structure in response to a detected rotation of the tactile input means.

A primary object of the present invention is to provide a reliable and intuitive device for controlling navigation of three-dimensional spaces. A primary advantage of the present invention is that both translation and rotation are easily effected with the device of the invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention provides an intuitive system for controlling the negotiation of three-dimensional ("3D") spaces (either virtual or real). Two-dimensional (or even one-dimensional) spaces can also be negotiated, although the power of the invention is somewhat lost in such spaces. The negotiation capability is achieved through an input device having tactile sensors which are arranged in a manner that has a geometric correspondence to a 3D coordinate system. The movement of a computer surrogate can be modified through manipulation of this input device. The types of movement that can be applied through the device are rotation and projection (also known as translation). These manipulations are preferably effected through application to the input device of twisting and tactile stimulus, respectively, although tactile stimulus may be used to effect rotation as well. Standard matrix operations, well known in the art, are utilized to effect the transformations of translation and rotation.

The preferred embodiment of the invention comprises two basic components, a data component and a hardware component. The data component comprises a variety of selectable 3D coordinate systems and a surrogate that is moved within them. Examples of 3D coordinate systems include spherical, cylindrical, and Cartesian. Examples of surrogates include a 3D computer display cursor, an icon, a singularity (such as a mathematical point, having position but no dimension), or an object such as a virtual spaceship.

The hardware component of the invention comprises an input device such as that taught in parent U.S. patent application Ser. No. 07/957,874 (U.S. Pat. No. 5,666,473). This input device is a graspable, somewhat rigid, closed surface in contact with rotational sensors, preferably one to three. Examples of forms the closed surface could take are a ball, a hemisphere, or a box. The closed surface is covered with a network of tactile (or other type) sensors (for the hemisphere, the base would preferably not have sensors). The centroid of the closed convex surface corresponds to the origin of a local 3D coordinate system (lcs) located at the centroid of the surrogate (for the hemisphere, the origin would preferably correspond to the center of its base). The surrogate itself resides in a space defined by a world coordinate system (wcs).

The position of the surrogate within the data component of the invention (wcs) is modified in response to user-manipulation of the hardware component of the invention. Let it be assumed that the user rotates the hardware component about one or more of its axes. Corresponding rotational transformations are then applied to the surrogate. Let it be assumed that the user applies tactile pressure to a region on the hardware portion of the device. Corresponding translations are then applied to the position of the surrogate within the data component. The user can continue to apply tactile pressure to the surface of the hardware component, working on all sides, and viewing the progress through a computerized rendition of the data portion (and seeing whichever view of the data he/she wishes) until he/she has achieved the desired negotiation through space of the surrogate.

Alternatively, rotation of the surrogate may be effected while keeping the input device stationary relative to the user. In this embodiment, the input device is preferably marked so that its orientation with respect to the user is fixed (though such marking is useful for any embodiment). This embodiment makes use of the fact that any two points on a sphere define a great circle, or, equivalently, an axis of rotation. By activating two sensors simultaneously the surrogate can be caused to rotate along the defined great circle. The amount of rotation may be determined by the length of time the sensors are activated and the speed of rotation may be determined by the force with which the sensors are activated. Both of these parameters are subject to prior user calibration. The software interface will keep track of the rotation and remap its inputs to correspond to the sensors on the fixed-orientation input device. Neither the input device nor the surrogate would have to be a sphere for this technique to work; rotation can be envisioned for any object shape having a closed surface.

The advantage of this method is that the input device may be carried in both hands and be both put down and picked up without regard to affecting the surrogate's motion or orientation. The advantage over competing free rotation techniques, such as those utilizing a gyroscope or applied electric or magnetic fields, is simplicity, ease of use, portability, and cost. Either embodiment may be used, depending on the desired application.

Alternately, rotations can be achieved by tactile shear pressure applied to the surface of the device (as taught in the parent application), defining a direction of rotation of the surrogate. In addition, such shear forces can cause traversal by the surrogate by defining either tangential rays or arcs along which the surrogate may move.

Figure 1:
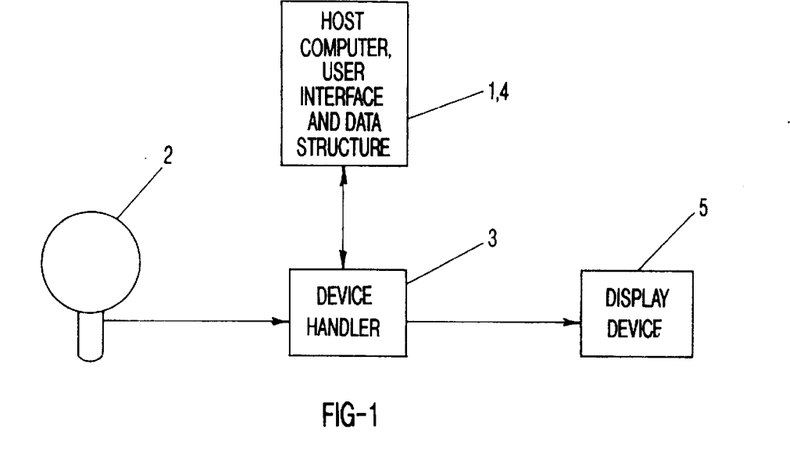
FIG. 1 is a block diagram of the preferred three-dimensional object definition, surrogate motion, and display system incorporating the present invention.

Referring to FIG. 1, the invention comprises a data component 1 and a hardware component 2, which are linked through a device handler 3 and a computer 4 which, in addition to calculation and user interface operations, provides feedback of hardware inputs and resulting data modifications through a display device 5. The data component is embedded in the computer via either software or hardware, and contains information about surrogate objects and 3D coordinate systems. Specific manipulations of the hardware device cause specific changes in selected data sets, leading to changes in the position and orientation of the surrogate object. The data portion, and its resulting changes are viewed through the computer display device.

Figure 2:
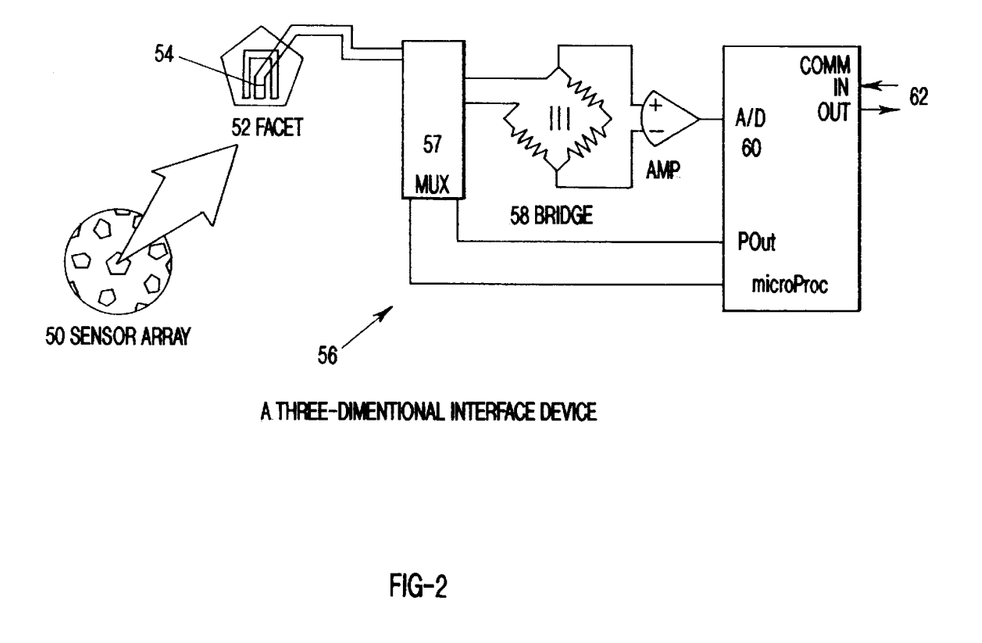
FIG. 2 is a schematic diagram of the preferred hardware of the invention.

In the preferred embodiment, as depicted in FIG. 2, the input device 50 is cubical to roughly spherical and has facets 52 (for example, 20 facets). On each facet is a force sensor 54. An embedded microcontroller 56 addresses each facet, and via a multiplexer 57, an addressable bridge amplifier 58, and an analog-to-digital converter 60 measures the force on that facet. This information is then sent over a communications link 62 to a central computer (not shown) that maps this interface information onto an application program. Optional components include: a varying number of facets and essentially closed convex overall shape (such as polyhedra, spheres, ovoids, and the like); software to detect when a facet is tapped multiple times to evoke a different response, such as a pulling out rather than a compression effect; software to discern when the user is attempting to manipulate the surface as opposed to sensor drift; a handle to eliminate reaction forces of just holding the sphere in place against shaping forces that might in turn be interpreted as shaping forces; a six degree-of-freedom sensor to add position in space, roll, pitch, and yaw to the data stream; and in lieu of an array of force transducers, a continuous force sensing transducer with a grid of measuring points, which can be applied over a generic shape.

Figure 3:
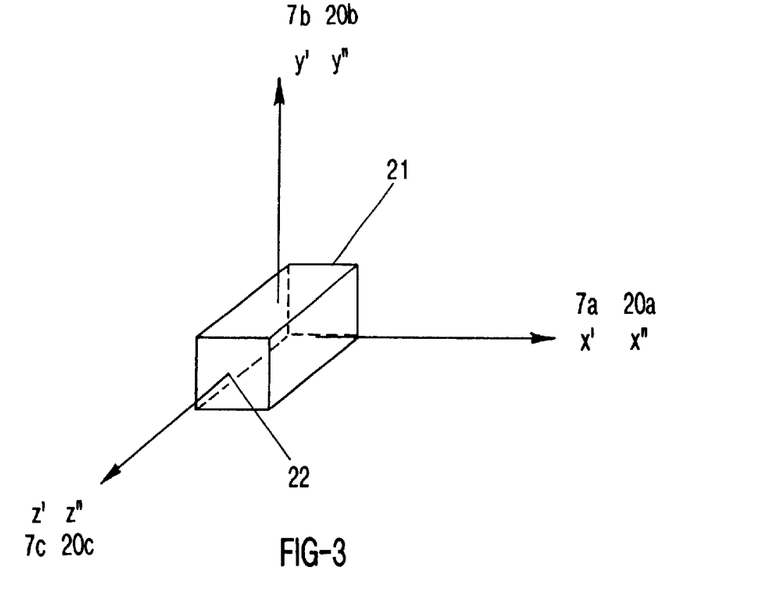
FIGS. 3–8 are conceptions of the preferred hardware and data structure portions of the invention, including depictions of example hardware-data structure interactions.

FIG. 3 is a depiction of a data structure as a surrogate (rectangular parallelepiped) 21 located at the center of a Cartesian world coordinate system. The Cartesian coordinate system has associated three orthogonal axes; x', y', and z' 7a,7b,7c. The local coordinate system is centered at the center of the surrogate. It has three associated orthogonal axes; x", y", and z" 20a,20b,20c. At the state recorded in this figure, the local coordinate system axes are in line with the world coordinate system axes. The front face 22 of the surrogate is pointed in the direction of the positive z' and z" axes.

Figure 9:
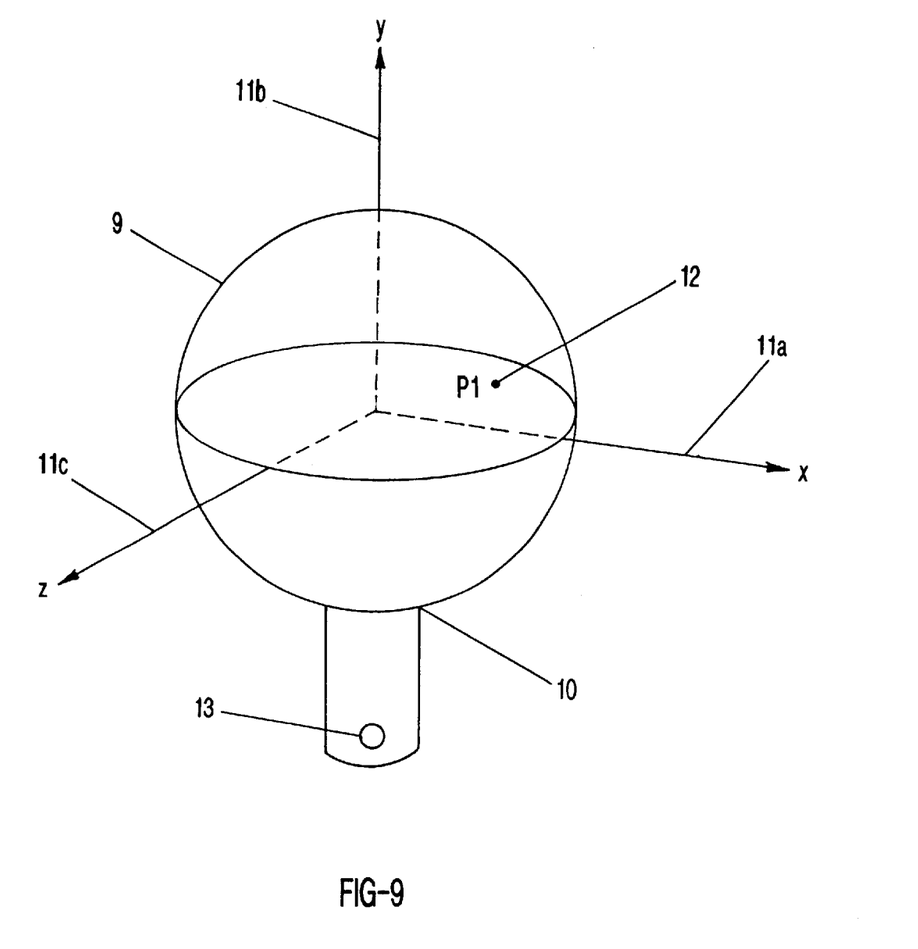
FIG. 9 illustrates the preferred tactile computer input device of the invention.

The hardware component of the invention consists of an input device as shown in FIG. 9.

This input device is a graspable, somewhat rigid, closed surface 9 in contact with one to three rotational sensors 10. As with a common computer "mouse", the sensors employ potentiometers or other technologies to monitor the rotation of the closed surface with respect to up to three orthogonal axes, all of which intersect the centroid of the closed surface 11a,11b,11c. Examples of forms the closed surface could take are; a ball, a box, an egg-shaped ovoid, or a generic human head.

Figure 4:
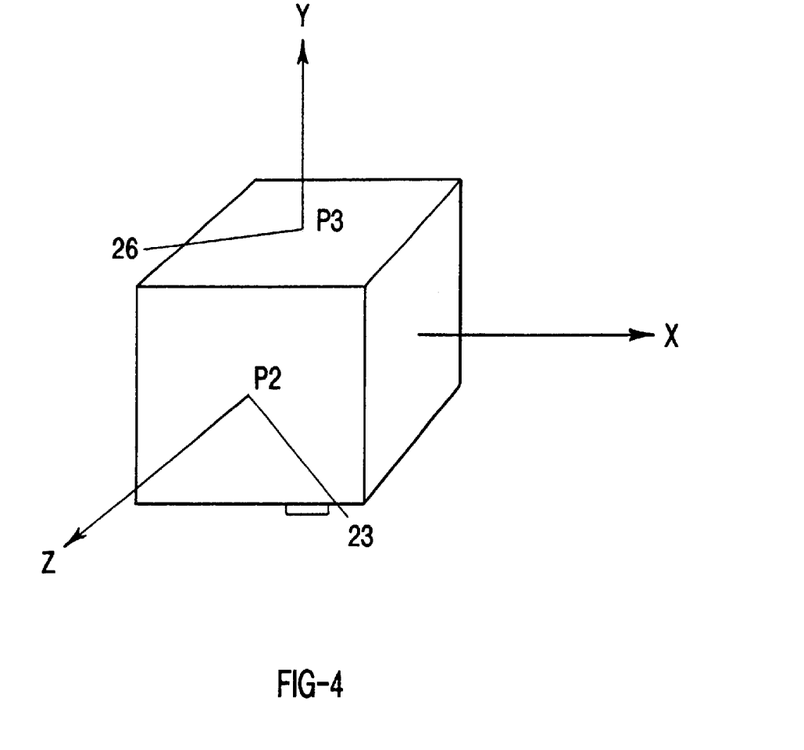

For purposes of illustrating the user interface application of the invention, FIG. 4 is presented. In this figure, the closed surface is a box. A single sensor resides on/within each of the boxes' six faces. The front sensor from this network is depicted as point P2 23.

The data component of the invention is modified in response to user-manipulation of the hardware component of the invention. Let it be assumed that the user rotates the hardware component about one or more of its axes. Corresponding rotational transformations are then applied to the surrogate. Let it be assumed that the user applies tactile pressure to a region on the hardware component of the device. Corresponding translations are then applied to the surrogate's position. The user can continue press the surfaces of the hardware component, and rotate the hardware component, working on all sides, and viewing the progress through a computerized rendition of the data component (and seeing whichever view of the data he wishes) until he has achieved the desired negotiation through space of the surrogate.

As with the individual keys of a computer keyboard, each sensor has a corresponding identifying binary signal. When the sensor is pressed, the signal is transmitted to the central processing unit ("cpu"). The signal continues to transmit as long as the sensor is pressed, if desired.

Through the user interface, a dataset may be selected. Once selected, the image of the data structure appears on the computer display device. The data structure is oriented with respect to a world coordinate system in a manner that corresponds to the current orientation of the input device, as shown in FIGS. 3 and 4. In those figures, the front face of the surrogate has a position which corresponds to the position of sensor P2 23 on the input device.

When the user applies direct tactile pressure to the input device, a sensor on the device may be activated. When this occurs, the associated binary signals are sent to the cpu, where calculations are performed that determine the new position of the surrogate.

Each node on the surface of the input device can be considered to lie within a ray that emanates from the centroid of the device. Corresponding rays extend from the centroid of the surrogate in directions that correspond to the current orientation of the input device. The surrogate can move along a ray in response to the pressing of a node of the input device. With respect to the discussion in the Background Art section, these translations fall under a projection approach.

Figure 5:
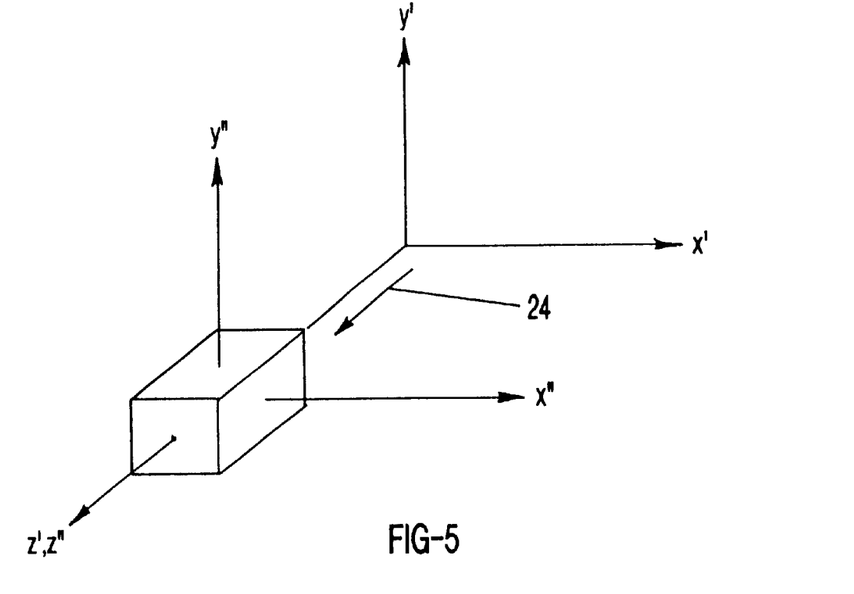
Figure 6:
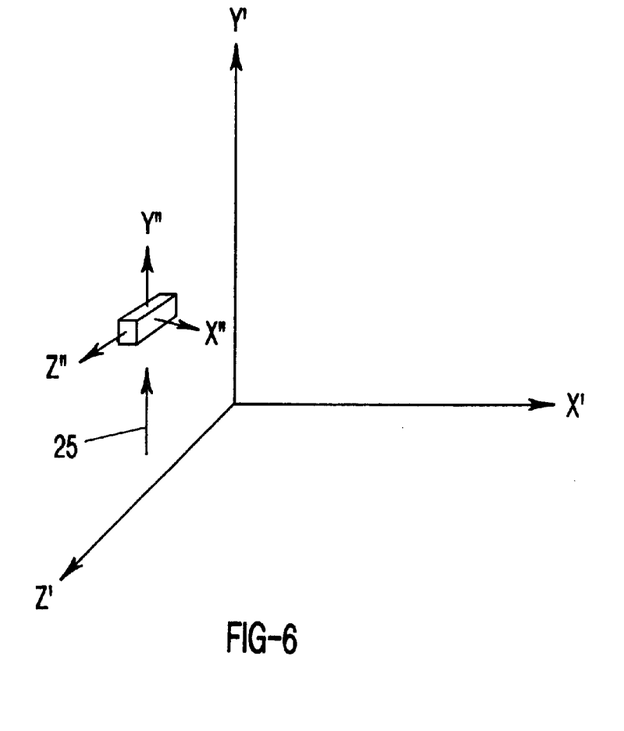

FIG. 5 shows a surrogate that has moved along the positive z axis (both wcs and lcs) 24 in response to tactile pressure applied to point P2 23 of the input device. FIG. 6 illustrates a subsequent translation of the surrogate in a direction parallel to the positive y axis 25, as a result of tactile pressure applied to point P3 26 (see FIG. 4).

Programming of the device may be such that the length of time the sensor is pressed dictates the distance the surrogate is projected. For this example that means that the longer the sensor that represents P2 is pressed, the farther the surrogate will travel along its positive z axis. The speed of projection is adjustable by the user, through the user interface or a hardware mechanism.

Customary rotational matrix transformations can be coded in to handle any possible sequence of rotations about any axis, as already described in the parent application. With respect to the discussion of the prior art, these rotations fall under a displacement approach.

Figure 7:
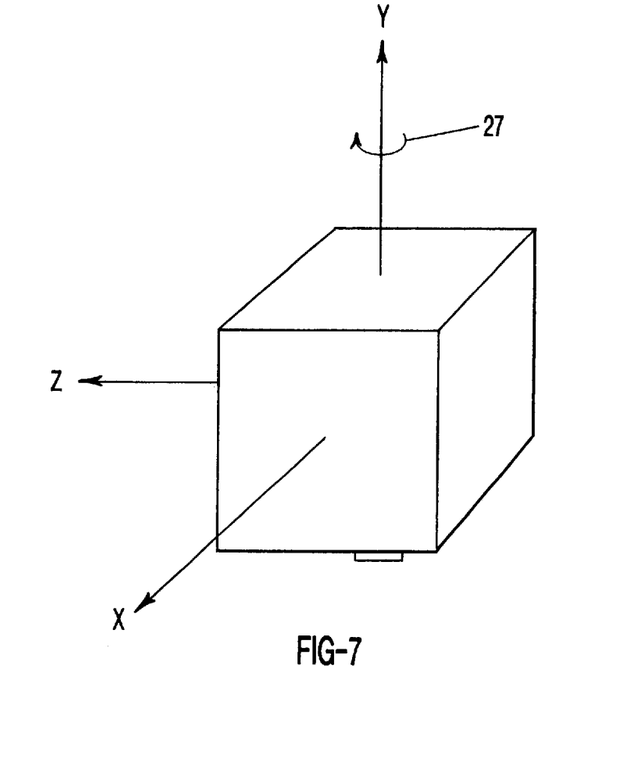
Figure 8:
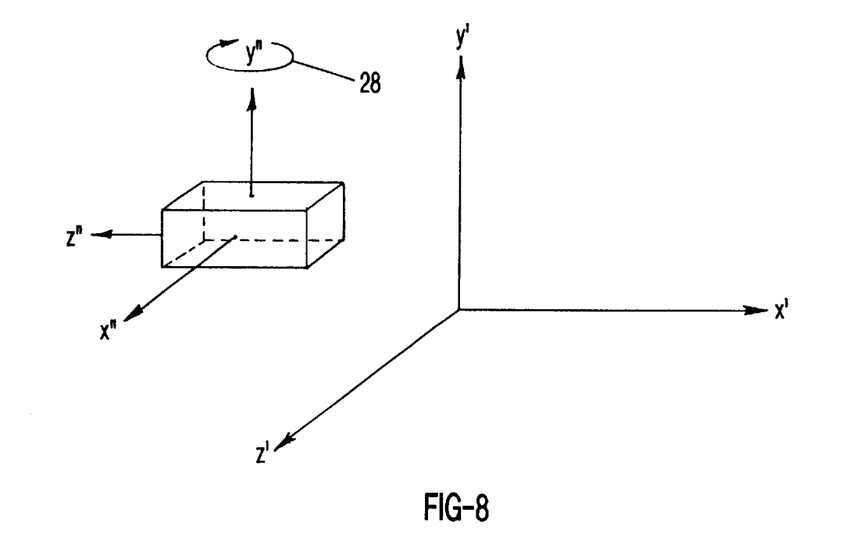

When the user grasps the input device and twists it about one of the device's internal axes, the appropriate directional sensors send rotational information to the cpu, where rotational operations are applied to the selected data structure. The new orientation of the surrogate is depicted on the display device and reflects the new orientation of the input device. FIG. 7 depicts the rotation of the input device 90 degrees about its y axis 27. FIG. 8 shows the surrogate which has now also been rotated 28 in response to signals sent to the computer due to rotation of the input device. Given a rotation of the input device of 90 degrees about its y axis, the new orientation of the surrogate is such that its front now faces in a direction parallel to that of the negative x axis. In other words, the z" axis is now parallel to the x' axis.

Figure 10:
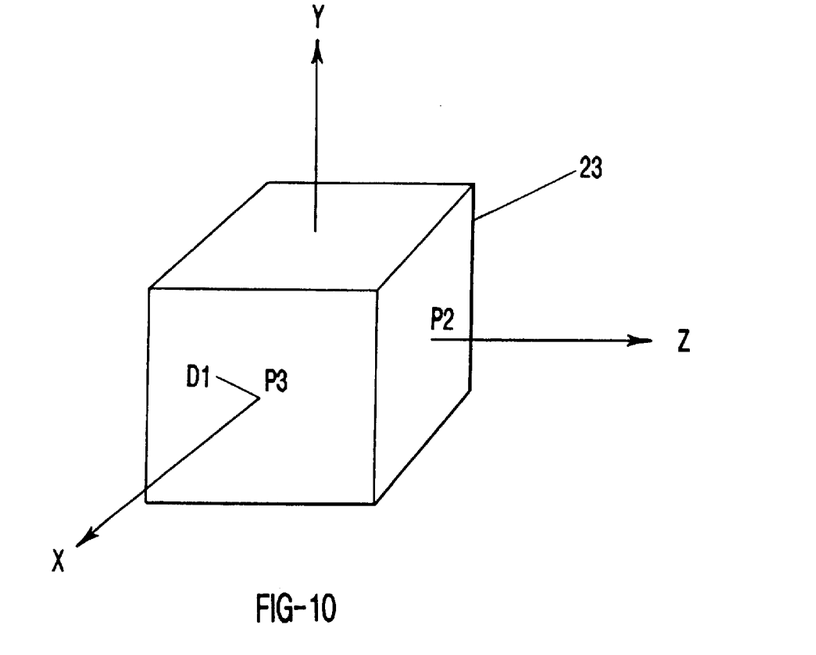
FIGS. 10–14 depict alternate hardware-data structure interactions for the shear force displacement and rotation embodiment of the invention.
Figure 11:
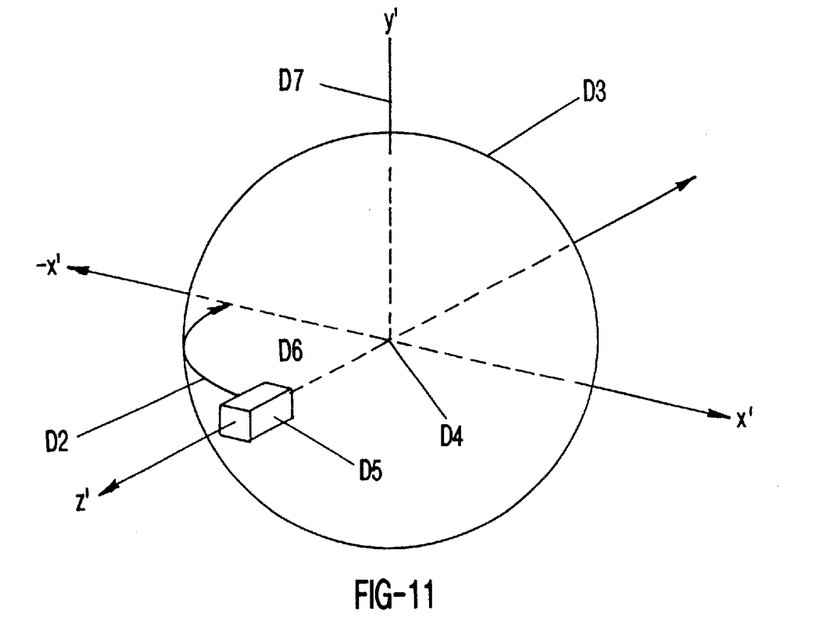
Figure 12:
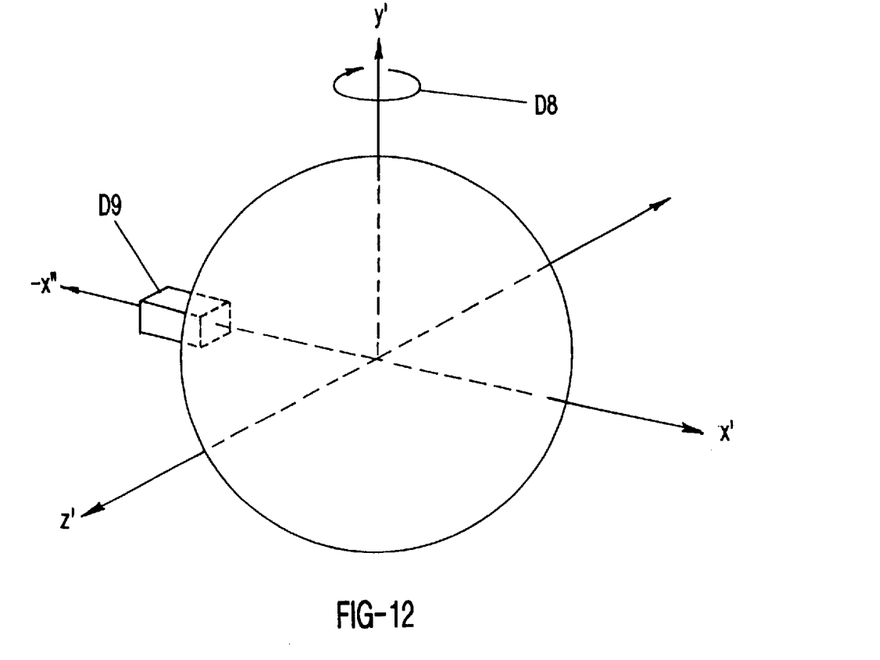

Alternately, traversals can be achieved by tactile pressure applied to the surface of the device (as taught in the parent disclosure), defining an arc of traversal by the surrogate. Consider a current position and orientation of the surrogate defined by FIG. 6. FIG. 10 depicts tactile pressure applied to the input device at two locations nearly simultaneously, first at P2 23, then at P3 d1. FIG. 11 illustrates that those two locations implicitly define the endpoints of an arc d2 along the surface of a macro sphere d3 whose center d4 is the origin of the wcs, and whose radius is the distance from the origin to the centroid of the surrogate d5. The starting point for the arc is the current position of the centroid of the surrogate. The arc implicitly defines an angle of rotation, beta d6, and an associated axis of that rotation d7 for the macro sphere. In this example, both locations of tactile pressure are applied at a position level with the xz plane and in a direction parallel with that same plane. Within that plane, the direction is oriented from the positive z axis towards the negative x axis. The associated axis for rotation is therefore coincident with the existing y' axis of the wcs. FIG. 12 illustrates that as the macro sphere rotates d8, the surrogate is moved along the arc to a position in line with the negative x axis, yet maintaining the same distance from the origin of the was d9.

The user may control the speed and/or degree of rotational response of the macro sphere. Let it be assumed that the user applies tactile pressures to the input device, as described and illustrated. The cpu may be set to respond to either the length of time the pressure is applied or to the magnitude of the pressure (or to both), in order to determine the magnitude of the angle of rotation, beta, to be applied to the macro sphere. This then determines the speed of traversal by the surrogate along the arc.

Figure 13:
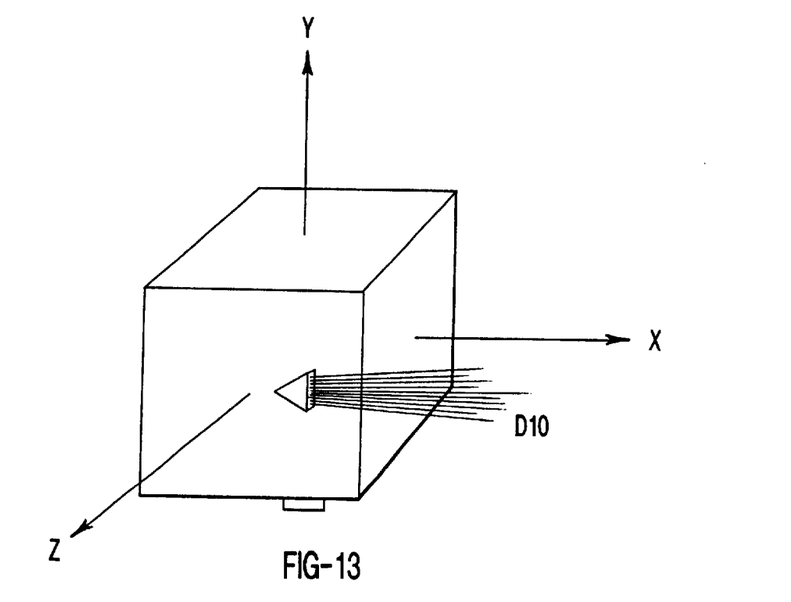
Figure 14:
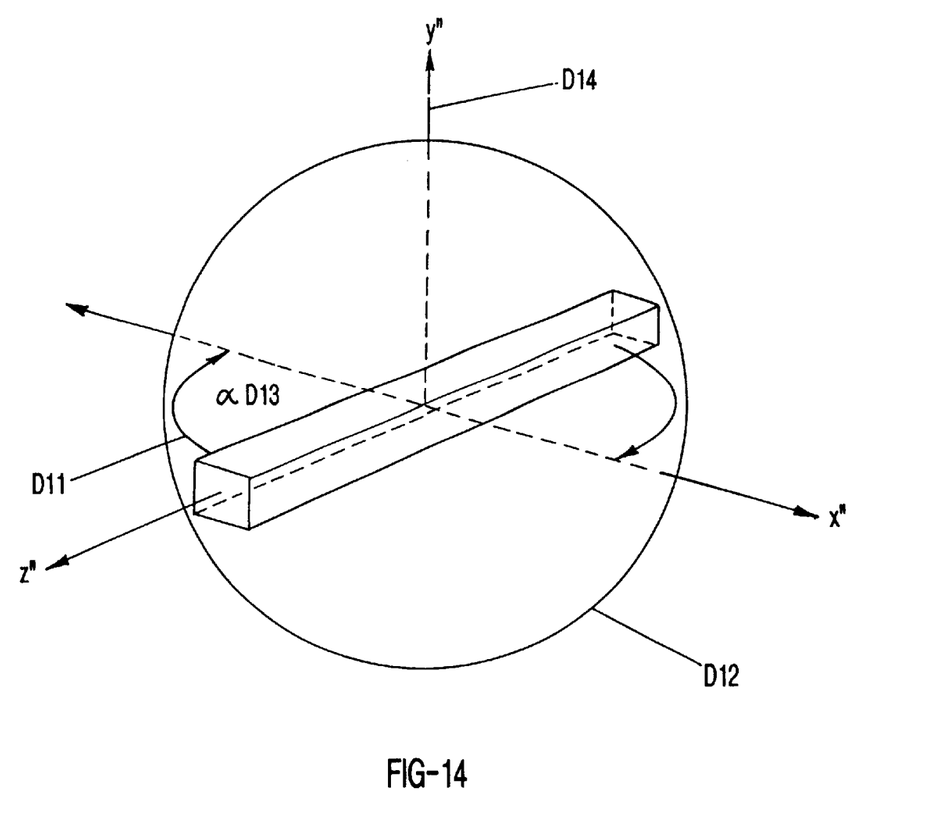

Alternately, rotations can be achieved by tactile shear pressure applied to the surface of the device (as taught in the parent disclosure), defining a direction of rotation of the surrogate. Consider a current position and orientation of the surrogate defined by FIG. 6. FIG. 13 depicts a tactile shear force d10 applied to the input device at point P2 23. That force vector implicitly possesses a magnitude and direction. The direction can be interpreted by the cpu in several ways. One way would be as illustrated in FIG. 14. In response to the directionality of the applied shear force, an arc d11 is defined along the surface of a local sphere d12 whose center is the centroid of the surrogate 21. The arc implicitly defines an angle of rotation, alpha 13, and an associated axis of that rotation d14, for the local sphere (and therefore, for the surrogate). In this example, the shear force is applied at a position level with the xz plane and in a direction parallel with that same plane. Within that plane, the direction is oriented from the positive z axis towards the negative x axis. The associated axis for rotation is therefore coincident with the existing y" axis of the surrogate.

The magnitude of the vector can be correlated to the speed and/or degree of rotational response of the surrogate. Let it be assumed that the user applies a tactile shear force to the input device, as described and illustrated. The cpu may be set to respond to either the length of time the force is applied or to the magnitude of the force (or to both), in order to determine the magnitude of the angle of rotation, alpha, to be applied to the surrogate. In this example, shear forces are applied in such a manner that the surrogate rotates 90 degrees, as shown in FIG. 8.

Alternately, traversals can be achieved by tactile shear pressure applied to the surface of the device (as taught in the parent disclosure), defining an arc of traversal of the surrogate. Consider a current position and orientation of the surrogate defined by FIG. 6. FIG. 13 depicts a tactile shear force d10 applied to the input device at point P2 23. That force vector implicitly possesses a magnitude and direction. The direction can be interpreted by the cpu in several ways. One way would be as illustrated in FIG. 11. In response to the directionality of the applied shear force, an arc d2 is defined along the surface of a macro sphere d3 whose center d4 is the origin of the wcs, and whose radius is the distance from the origin to the centroid of the surrogate d5. The starting point for the arc is the current position of the centroid of the surrogate. The arc implicitly defines an angle of rotation, beta d6, and an associated axis of that rotation d7 for the macro sphere. In this example, the shear force is applied at a position level with the xz plane and in a direction parallel with that same plane. Within that plane, the direction is oriented from the positive z axis towards the negative x axis. The associated axis for rotation is therefore coincident with the existing y' axis of the wcs. FIG. 12 illustrates that as the macro sphere rotates d8, the surrogate is moved along the arc to a position in line with the negative x axis, yet maintaining the same distance from the origin of the wcs d9

The magnitude of the vector can be correlated to the speed and/or degree of rotational response of the macro sphere. Let it be assumed that the user applies a tactile shear force to the input device, as described and illustrated. The cpu may be set to respond to either the length of time the force is applied or to the magnitude of the force (or to both), in order to determine the magnitude of the angle of rotation, beta, to be applied to the macro sphere. This then determines the speed of traversal of the surrogate and the length of the arc that the surrogate travels along.

As with all user manipulations associated with the invention, the processing power and speed of the cpu, the communication flux of the interface between the cpu and the input device, the efficiency of the software, and the memory configuration of the system will all determine whether or not changes in the data structure are reflected on the display device in real time. Real time feedback of changes is a desirable attribute of the total system. In addition, the higher the density of sensors on the input device, the greater the mobility of the surrogate. However, it is anticipated that a boxlike configuration, with only six sensors (to represent the six directions a surrogate could travel along three orthogonally intersecting lines) would be adequate for many applications.

A user may have the need to view the surrogate from various vantage points or to have a view in various directions from the position of the surrogate. It is anticipated that a direction of view of the surrogate may be associated with each face of the input device. If the user is thought to be situated at the center of the surrogate (or at the surrogate itself, if the surrogate is a singularity), the center of a selected face defines a direction of view along a ray originating at the surrogate's center. A default direction of view may be facing the direction that the surrogate is traveling (or has most recently traveled) in. In any case, these views would be likely associated with the relative positions of the nodes or faces of the input device.

The above discussion has been intended to be illustrative and not limiting. Naturally the device would have increased utility as it was coupled with various other software and/or hardware.

Among other things, the positions of the surrogate would be stored and the user would have the option to return exactly to previous positions, or to home, which would likely be some desired initial position. Also, tactile feedback devices such as those used in virtual reality systems could be easily incorporated into the invention, further augmenting its appeal in certain cases. For another example, the device could be used as a user interface to control the positions of actual physical motive objects, such as remote controlled drones or submarines.

Still other applications of the device are possible, particularly for any fields which have spatial analogs. For example, databases may be developed in which the organization of data can be correlated to locations within a wcs. The database may then be searched via analogous movement of the surrogate. For another example, the user may wish to move/rotate more than one surrogate at a time. This could be accomplished through appropriate programming.

The essence of the device remains the same as in the parent patent application. With respect to a wide range of applications, the device allows a user to exploit his/her innate sense of three-dimensional space in intimate conjunction with the tactile and manipulative abilities of the user's hands. It achieves this primarily by its shape (and interface programming) which is intrinsically correlated to the most useful ways of defining three-dimensional geometries. Of these geometry definitions, the most common ones are spherical and Cartesian geometries. The device represents an envelope, or closed surface, which surrounds the origin of the coordinate systems of such three-dimensional geometries. Actions by the hands of the user on specific portions of the envelope are then translated to various effects upon associated specific portions of the data field defined within the three-dimensional geometry.

Although its utility would be diminished, the device may be functional as a hemisphere class shape. In this example, referring to FIG. 9, the only portion accessible to tactile input would be the part lying above the xz plane. Programming would be required to effect negotiation of the surrogate (or deformations of an object) in the missing hemisphere.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A passive, human-manipulatable computer interface apparatus comprising tactile input means comprising an essentially closed, essentially convex, and essentially rigid exterior surface comprising a plurality of independent tactile sensors and means for communicating signals from said tactile sensors to a computer equipped with display means, wherein locations of all said tactile sensors on said surface correspond in three dimensions to locations or vectors represented within a data structure on said computer.

2. The apparatus of claim 1 additionally comprising means for manipulating said data structure in response to pressure stimuli on said tactile sensors.

3. The apparatus of claim 1 additionally comprising means for translating to a different apparent position within a space represented by said data structure in response to pressure stimuli on said tactile sensors.

4. The apparatus of claim 1 additionally comprising means for rotating an object represented by said three-dimensional data structure means in response to pressure stimuli on a plurality of said tactile sensors.

5. The apparatus of claim 1 wherein said tactile input means comprises means for rotating said tactile input means and means for detecting rotation of said tactile input means.

6. The apparatus of claim 5 additionally comprising means for rotating said three-dimensional data structure means in response to rotation stimuli on said means for detecting rotation.

7. A passive, human-manipulatable computer interface apparatus comprising tactile input means comprising an essentially closed, essentially convex, and essentially rigid exterior surface comprising a plurality of independent tactile sensors and means for communicating signals from said tactile sensors to a computer, wherein locations of all said sensors on said surface correspond in three dimensions to locations or vectors represented within a data structure on said computer.

8. The apparatus of claim 7 wherein said communicating means comprises means for communicating tactile input on said tactile sensors.

9. The apparatus of claim 7 wherein said tactile input means comprises means for rotating said tactile input means and means for detecting rotation of said tactile input means.

10. A computer interface method comprising the steps of providing passive, human-manipulatable tactile input means comprising an essentially closed, essentially convex, and essentially rigid exterior surface comprising a plurality of independent tactile sensors and communicating signals from the tactile sensors to a computer equipped with a display, wherein locations of all said sensors on said surface correspond in three dimensions to locations or vectors represented within a data structure on the computer.

11. The method of claim 10 additionally comprising the step of manipulating the data structure in response to pressure stimuli on the tactile sensors.

12. The method of claim 10 additionally comprising the step of translating to a different apparent position within a space represented by the data structure in response to pressure stimuli on the tactile sensors.

13. The method of claim 10 additionally comprising the step of rotating an object represented by the data structure in response to pressure stimuli on a plurality of the tactile sensors.

14. The method of claim 10 wherein the providing step comprises providing tactile input means which rotate and additionally comprising the step of detecting rotation of the tactile input means.

15. The method of claim 14 additionally comprising the step of rotating the three-dimensional data structure in response to a detected rotation of the tactile input means.

16. A passive, human-manipulatable computer interface method comprising the steps of providing tactile input means comprising an essentially closed, essentially convex, and essentially rigid exterior surface comprising a plurality of independent tactile sensors and communicating signals from the tactile sensors to a computer, wherein locations of all said sensors on said surface correspond in three dimensions to locations or vectors represented within a data structure on the computer.

17. The method of claim 16 wherein the communicating step comprises communicating tactile input on the tactile sensors.

18. The method of claim 16 wherein the providing step comprises providing tactile input means comprising means for rotating the tactile input means and additionally comprising the step of detecting rotation of the tactile input means.

19. A passive, human-manipulatable computer interface apparatus comprising tactile input means comprising an essentially closed and essentially convex exterior surface comprising at least four independent tactile sensors located on or within said surface and spaced substantially uniformly over said surface and means for communicating signals from said tactile sensors to a computer equipped with display means.

20. A computer interface method comprising the steps of providing passive, human-manipulatable tactile input means comprising an essentially closed and essentially convex exterior surface comprising at least four independent tactile sensors located on or within the surface and spaced substantially uniformly over the surface and communicating signals from the tactile sensors to a computer equipped with a display.

21. A passive, human-manipulatable computer interface apparatus comprising tactile input means comprising an essentially closed and essentially convex exterior surface comprising a plurality of independent tactile sensors and means for communicating signals from said tactile sensors to a computer equipped with display means, wherein locations of all said tactile sensors on said surface correspond in three dimensions to locations or vectors represented within a data structure on said computer.

22. A computer interface method comprising the steps of providing passive, human-manipulatable tactile input means comprising an essentially closed and essentially convex exterior surface comprising a plurality of independent tactile sensors and communicating signals from the tactile sensors to a computer equipped with a display, wherein locations of all said sensors on said surface correspond in three dimensions to locations or vectors represented within a data structure on the computer.

* * * * *